(12) United States Patent
Berger, III et al.

(10) Patent No.: US 9,568,628 B2
(45) Date of Patent: *Feb. 14, 2017

(54) SYSTEM FOR MONITORING A SURFACE FOR GAS AND OIL FLOW

(71) Applicant: Berger Geosciences, LLC, Houston, TX (US)

(72) Inventors: William J. Berger, III, Houston, TX (US); William J. Berger, II, Houston, TX (US); James F. Keenan, Houston, TX (US); Zachary I. Metz, Houston, TX (US)

(73) Assignee: Berger Geosciences, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,098

(22) Filed: Jan. 29, 2016

(65) Prior Publication Data

US 2016/0252636 A1 Sep. 1, 2016

Related U.S. Application Data

(63) Continuation-in-part of application No. 14/563,968, filed on Dec. 8, 2014, now Pat. No. 9,261,391, which (Continued)

(51) Int. Cl.
*E21B 7/12* (2006.01)
*E21B 47/001* (2012.01)
(Continued)

(52) U.S. Cl.
CPC . *G01V 1/30* (2013.01); *E21B 7/12* (2013.01); *E21B 21/001* (2013.01); *E21B 44/00* (2013.01);
(Continued)

(58) Field of Classification Search
CPC ...... E21B 7/12; E21B 21/001; E21B 47/0001; E21B 47/0002; E21B 47/12
See application file for complete search history.

(56) References Cited

U.S. PATENT DOCUMENTS 4,001,764 A * 1/1977 Holland ................. G01S 15/88
367/106
4,520,665 A 6/1985 Cordier et al.
(Continued)

FOREIGN PATENT DOCUMENTS

WO WO-2013/153135 A2 10/2013

OTHER PUBLICATIONS

PCT Nov. 18, 2014 International Search Report and Written Opinion mailed in International Patent Application No. PCT/US2014/048105.

(Continued)

*Primary Examiner* — Matthew R Buck
(74) *Attorney, Agent, or Firm* — Gardere Wynne Sewell LLP; Terrell R. Miller; Teresa J. Lechner-Fish

(57) ABSTRACT

A system for monitoring for gas and oil flow venting from a surface using time intervals, size and velocity, and using an analysis processor with a data storage containing a bubble flow classification and bubble flow categories. The data storage receives at least one of: video feed, logging while drilling data feed, seismic profile data feed, drilling parameter data feed, measurement while drilling data feed, sonar data feed, hydrographic data feed and a laser data feed to verify a determined bubble flow category and bubble flow classification as a baseline bubble flow classification and provides an alarm when a bubble flow emergency is ascertained due to a change in bubble flow classification without an anticipated change or changes outside predefined acceptable limits within the video feed, logging while drilling data feed, seismic profile data feed, drilling parameter data feed, (Continued)

measurement while drilling data feed, sonar data feed, hydrographic data feed and a laser data feed.

27 Claims, 11 Drawing Sheets

Related U.S. Application Data is a continuation-in-part of application No. 14/188,607, filed on Feb. 24, 2014, now Pat. No. 8,905,155.

(60) Provisional application No. 61/859,159, filed on Jul. 26, 2013.

(51) Int. Cl.
| | |
|---|---|
| E21B 47/002 | (2012.01) |
| G01V 1/30 | (2006.01) |
| G06T 7/20 | (2006.01) |
| E21B 47/00 | (2012.01) |
| G01F 1/708 | (2006.01) |
| G01S 15/89 | (2006.01) |
| G01S 17/89 | (2006.01) |
| G01V 8/00 | (2006.01) |
| E21B 44/00 | (2006.01) |
| E21B 47/10 | (2012.01) |
| E21B 47/12 | (2012.01) |
| E21B 21/00 | (2006.01) |

(52) U.S. Cl.
CPC .............. *E21B 47/00* (2013.01); *E21B 47/10* (2013.01); *E21B 47/12* (2013.01); *G01F 1/7086* (2013.01); *G01S 15/89* (2013.01); *G01S 17/89* (2013.01); *G01V 8/00* (2013.01); *G06T 7/20* (2013.01); *G06T 2207/10016* (2013.01); *G06T 2207/30242* (2013.01)

(56) References Cited

U.S. PATENT DOCUMENTS

| | | | | |
|---|---|---|---|---|
| 4,571,984 | A * | 2/1986 | Malcosky | G01N 29/032 73/19.03 |
| 4,658,750 | A * | 4/1987 | Malcosky | G01N 29/032 114/242 |
| 4,659,218 | A * | 4/1987 | de Lasa | B01J 8/1809 250/227.29 |
| 4,759,636 | A | 7/1988 | Ahern et al. | |
| 4,948,258 | A * | 8/1990 | Caimi | G01B 11/2441 356/3.13 |
| 6,578,405 | B2 * | 6/2003 | Kleinberg | G01V 9/007 181/115 |
| 6,822,742 | B1 * | 11/2004 | Kalayeh | G01N 21/31 250/338.1 |
| 7,036,451 | B1 | 5/2006 | Hutchinson | |
| 8,767,063 | B1 * | 7/2014 | Berger, III | E21B 47/10 175/5 |
| 8,905,155 | B1 * | 12/2014 | Berger, III | E21B 47/10 166/250.01 |
| 9,261,391 | B2 * | 2/2016 | Berger, III | E21B 44/00 |
| 2002/0053430 | A1 | 5/2002 | Curtis et al. | |
| 2002/0063628 | A1 | 5/2002 | Chuang | |
| 2004/0007392 | A1 | 1/2004 | Judge et al. | |
| 2006/0129365 | A1 * | 6/2006 | Hammond | E21B 49/008 703/10 |
| 2006/0185899 | A1 | 8/2006 | Alft et al. | |
| 2006/0186889 | A1 | 8/2006 | Andreis | |
| 2007/0021916 | A1 | 1/2007 | MacGregor et al. | |
| 2008/0008031 | A1 | 1/2008 | Vigen et al. | |
| 2008/0115971 | A1 | 5/2008 | Kelleher et al. | |
| 2009/0087911 | A1 | 4/2009 | Ramos | |
| 2010/0002076 | A1 * | 1/2010 | Welker | G01V 1/38 348/81 |
| 2010/0005857 | A1 | 1/2010 | Zhang et al. | |
| 2010/0044034 | A1 | 2/2010 | Bailey et al. | |
| 2012/0210779 | A1 * | 8/2012 | Hallundbæk | E21B 47/102 73/152.18 |
| 2012/0229287 | A1 | 9/2012 | Schuetzle | |
| 2014/0067268 | A1 | 3/2014 | Tunheim et al. | |
| 2014/0284465 | A1 * | 9/2014 | Pottorf | G01V 9/007 250/253 |

OTHER PUBLICATIONS

PCT Feb. 23, 2016 International Search Report and Written Opinion mailed in International Patent Application No. PCT/US2015/064254.
May 5, 2014 Notice of Allowance / Allowability with Examiner's Amendment mailed in U.S. Appl. No. 14/188,597, filed Feb. 24, 2014.
Apr. 14, 2014 Office Action mailed in U.S. Appl. No. 14/188,607, filed Feb. 24, 2014.
Apr. 30, 2014 Amendment and Response to Office Action Dated Apr. 14, 2014 filed in U.S. Appl. No. 14/188,607, filed Feb. 24, 2014.
Jul. 23, 2014 Final Office Action mailed in U.S. Appl. No. 14/188,607, filed Feb. 24, 2014.
Jul. 28, 2014 Amendment and Response to Final Office Action Dated Jul. 23, 2014 filed in U.S. Appl. No. 14/188,607, filed Feb. 24, 2014.
Mar. 2, 2015 Office Action mailed in U.S. Appl. No. 14/563,968, filed Dec. 8, 2014.
Jun. 1, 2015 Amendment and Response to Office Action Dated Mar. 2, 2015 filed in U.S. Appl. No. 14/563,968, filed Dec. 8, 2014.

* cited by examiner

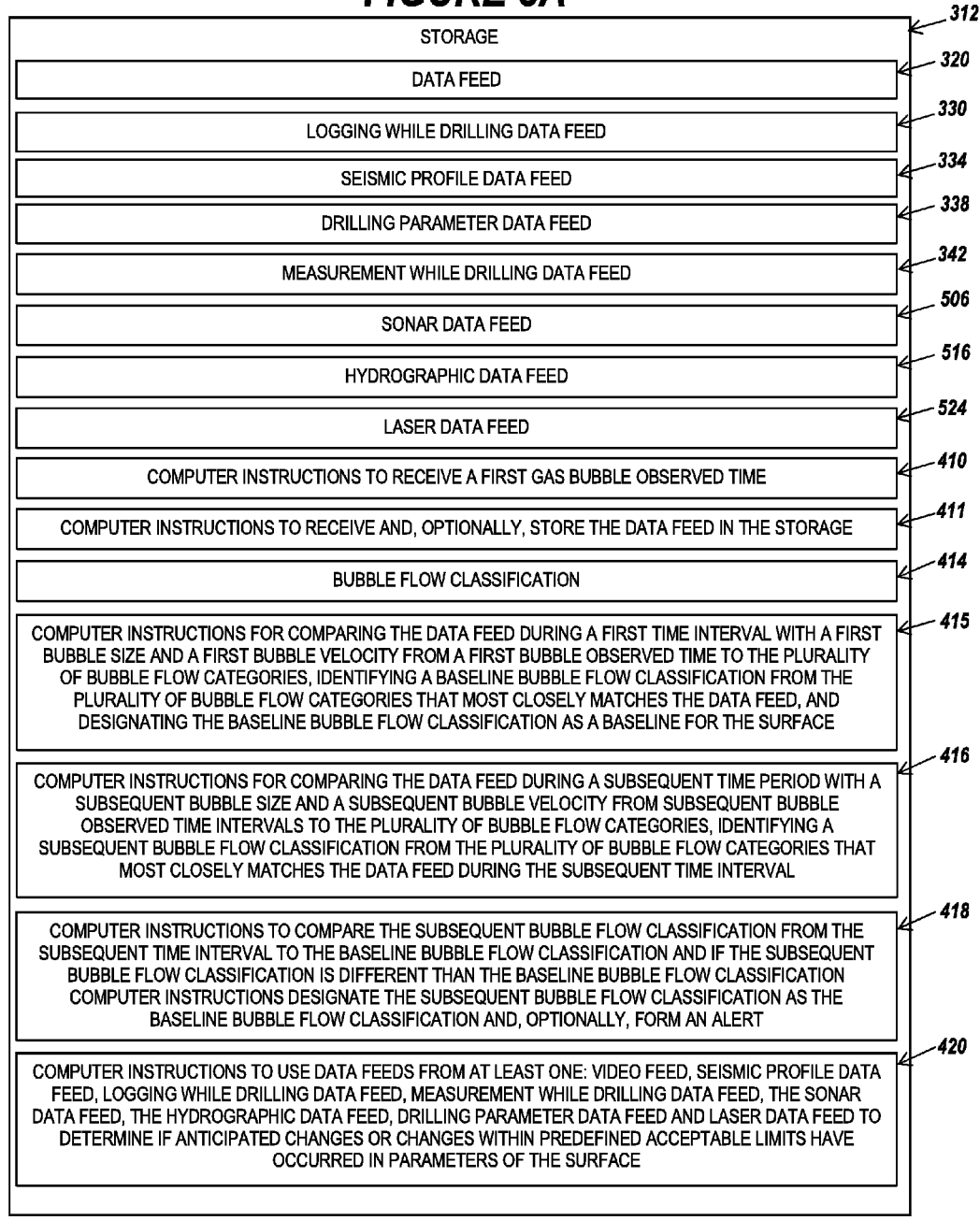

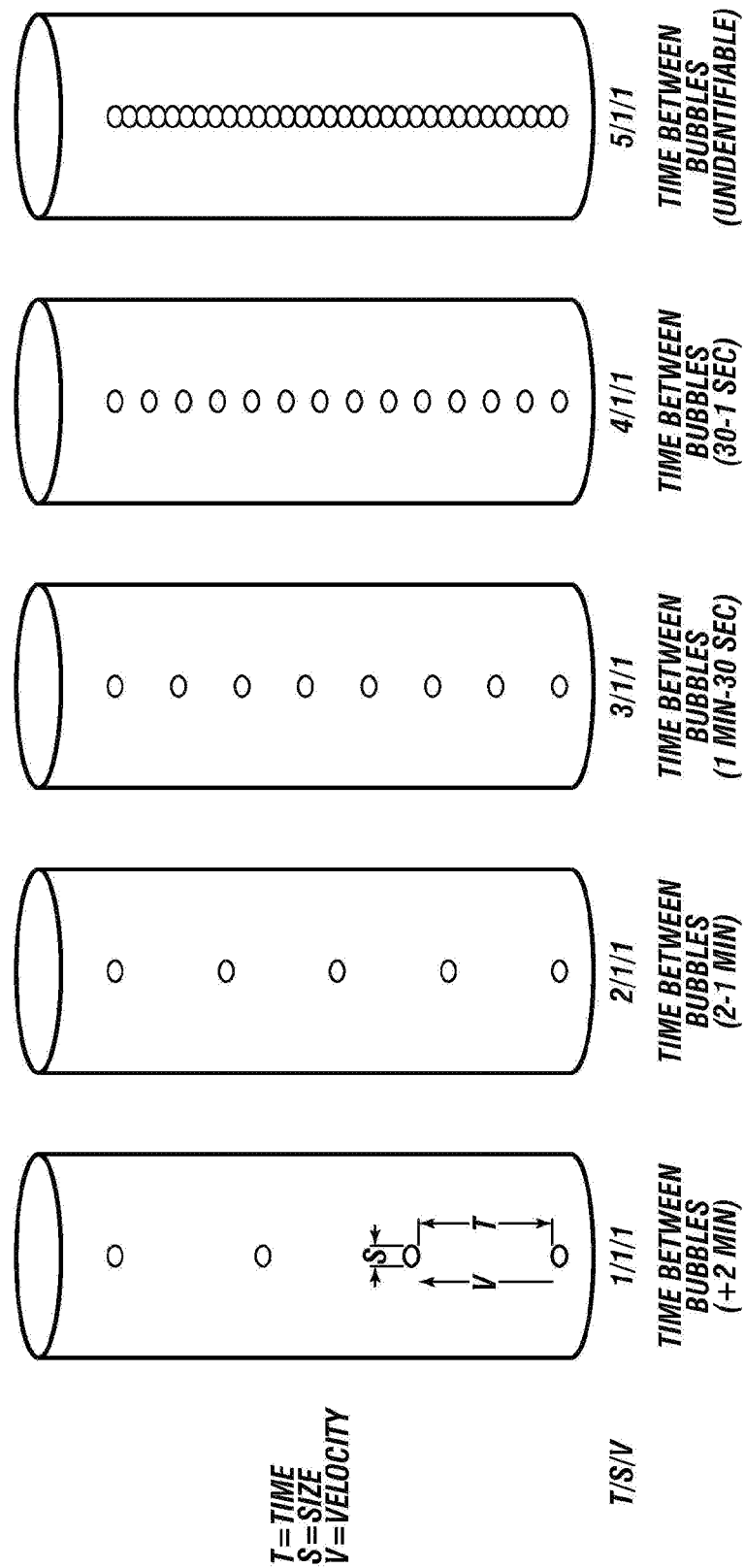

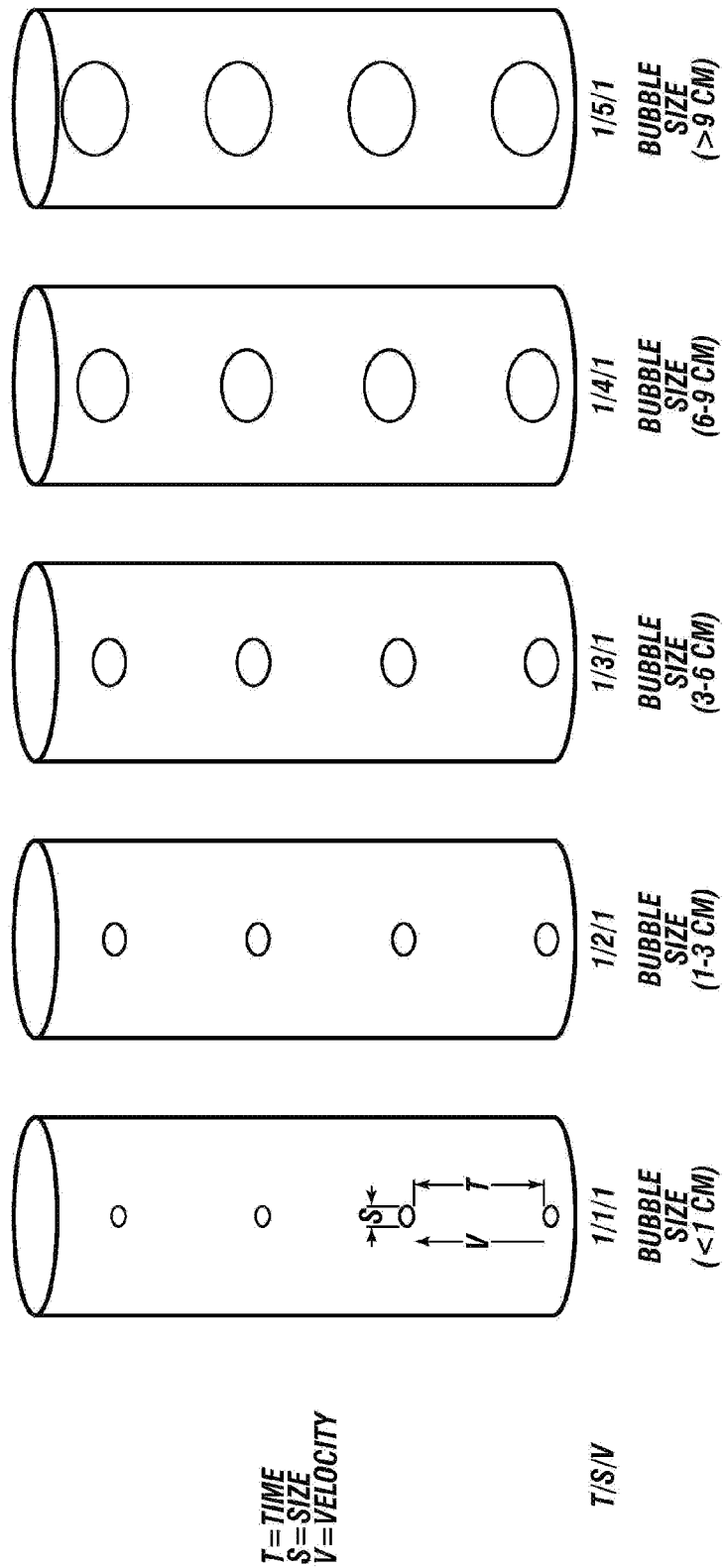

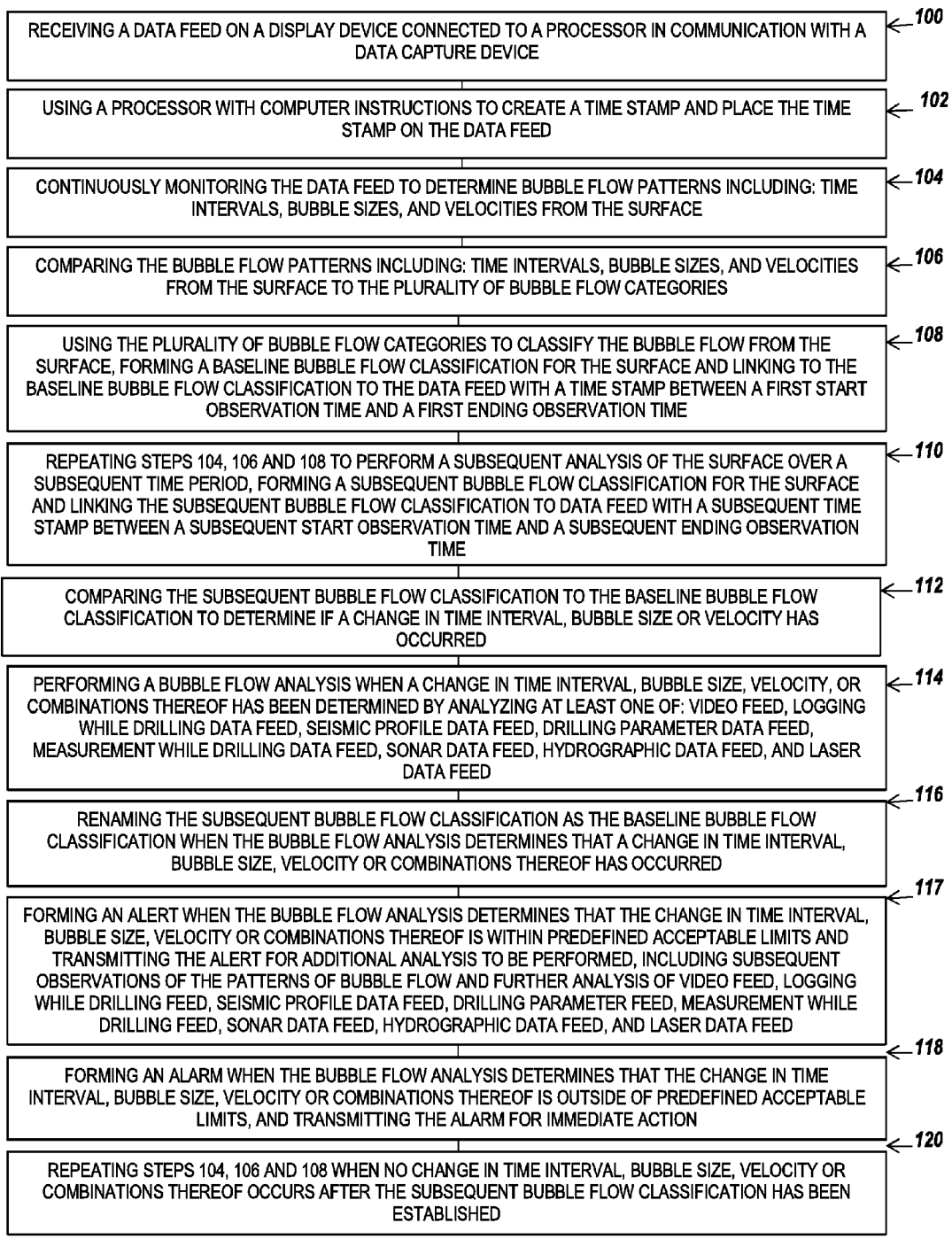

SYSTEM FOR MONITORING A SURFACE FOR GAS AND OIL FLOW

PRIOR RELATED APPLICATIONS

The current application is a continuation-in-part of and claims priority to U.S. patent application Ser. No. 14/563,968, filed on Dec. 8, 2014, entitled "SYSTEM FOR MONITORING A SURFACE FOR GAS AND OIL FLOW," which is continuation-in part of and claims priority to U.S. patent application Ser. No. 14/188,607, filed on Feb. 24, 2014, entitled "MARINE WELL FOR SHALLOW-WATER FLOW MONITORING," issued as U.S. Pat. No. 8,905,155 on Dec. 9, 2014, which claims priority to and the benefit of U.S. Provisional Patent Application Ser. No. 61/859,159, filed on Jul. 26, 2013, entitled "METHOD AND SYSTEM FOR MONITORING MARINE SHALLOW-WATER FLOW DURING MARINE DRILLING OPERATIONS." These patent applications and patents are incorporated herein in their entirety.

FEDERALLY SPONSORED RESEARCH STATEMENT

Not Applicable (N/A)

REFERENCE TO MICROFICHE APPENDIX

N/A

FIELD OF INVENTION

The present embodiments generally relate to a system for monitoring for gas and oil flow venting from a surface.

BACKGROUND OF THE INVENTION

A need exists for a system for monitoring for gas and oil flow venting from a surface and to provide an early indication of subterranean formation problems by analyzing bubble size, time interval, and velocity for bubbles or globules venting from a surface.

A further need exists for a system for monitoring for gas and oil flow venting from a surface utilizing a data feed (e.g., video feed) and a bubble flow classification to create a bubble flow classification for the surface, and then, additionally, to verify the bubble flow classification results using the data feed in real time, 24 hours a day, 7 days a week, from a plurality of data feeds including, but not limited to, at least one of: a video feed, a logging while drilling data feed, a seismic profile data feed, a drilling parameter data feed, a measurement while drilling data feed, a sonar data feed, a hydrographic data feed and a laser data feed, and further to monitor bubble flow and classify additional bubble flow over time to verify that the baseline bubble flow classification of bubble flow is valid or another classification of bubble flow needs to become the new baseline bubble flow classification.

A need exists for a system for monitoring for gas and oil flow venting from a surface during marine drilling, development, or production operations.

A need exists for a system for monitoring for gas and oil flow venting from a surface that can create immediate alarms regarding potentially dangerous situations and transmit those remote alarms to client devices, such as through a network.

The present embodiments meet these needs.

SUMMARY OF THE INVENTION

The present embodiments generally relate to a system for monitoring for gas and oil flow venting from a surface.

In an embodiment, a system for monitoring for gas and oil flow venting from a surface, wherein the system comprises: a data feed from a data capture device, an analysis processor connected to a network for receiving the data feed, a storage connected to the analysis processor, wherein the storage is a non-transitory computer readable medium, and computer instructions in the storage.

In an embodiment, the storage may include computer instructions for receiving a first bubble observed time input into the analysis processor when a first bubble is observed to flow from the surface.

In an embodiment, the storage may include computer instructions for receiving the data feed in the analysis processor.

In an embodiment, the storage may include computer instructions for comparing the data feed during a first time interval from the first bubble observed time to a plurality of bubble flow categories in the storage.

In an embodiment, the plurality of bubble flow categories may comprise a plurality of bubble time intervals, a plurality of bubble sizes and a plurality of bubble velocities.

In an embodiment, the storage may include computer instructions for identifying a bubble flow classification from a bubble flow classification in the storage that most closely matches the data feed during the first time interval, wherein the bubble flow classification in the storage comprises a plurality of bubble flow classifications of bubble flow from the surface.

In an embodiment, the storage may include computer instructions for designating the bubble flow classification as a baseline bubble flow classification for the surface.

In an embodiment, the storage may include computer instructions for comparing the data feed during a subsequent time interval from a subsequent first bubble observed time to the plurality of bubble flow categories, and identifying a subsequent bubble flow classification from the bubble flow classification in the storage that most closely matches the data feed during the subsequent time interval.

In an embodiment, the storage may include computer instructions for comparing the subsequent bubble flow classification from the subsequent time period to the baseline bubble flow classification.

In an embodiment, the storage may include computer instructions for designating the subsequent bubble flow classification as the baseline bubble flow classification and, optionally, generating an alert if the baseline bubble flow classification is different.

In an embodiment, the storage may include computer instructions for designating the subsequent bubble flow classification as the baseline bubble flow classification and, optionally, generating an informational message if the baseline bubble flow classification is the same.

In an embodiment, the data feed comprises one or more of: a video feed, a seismic profile data feed, a logging while drilling data feed, a drilling parameter data feed, a measurement while drilling data feed, a sonar data feed, a hydrographic data feed and a laser data feed to determine if anticipated changes or changes within predefined acceptable limits have occurred in the data feed. In an embodiment, the data feed comprises a video feed to determine if anticipated changes or changes within predefined acceptable limits have occurred in the data feed. In an embodiment, the data feed comprises a sonar data feed to determine if anticipated changes or changes within predefined acceptable limits have occurred in the data feed. In an embodiment, the data feed comprises a hydrographic data feed to determine if anticipated changes or changes within predefined acceptable limits have occurred in the data feed. In an embodiment, the data feed comprises a laser data feed to determine if anticipated changes or changes within predefined acceptable limits have occurred in the data feed.

In an embodiment, the data feed comprises one or more of: a video feed, a seismic profile data feed, a logging while drilling data feed, a drilling parameter data feed, a measurement while drilling data feed, a sonar data feed, a hydrographic data feed and a laser data feed to determine if anticipated changes or changes within predefined acceptable limits have occurred in the data feed.

In an embodiment, the storage may include computer instructions for forming an alarm when the subsequent bubble flow classification differs from the baseline bubble flow classification and no anticipated changes or changes outside of predefined acceptable limits have occurred in the data feed according to one or more of: the video feed, the seismic profile data feed, the logging while drilling data feed, the drilling parameter data feed, the measurement while drilling data feed, the sonar data feed, the hydrographic data feed and the laser data feed.

In an embodiment, the storage may include computer instructions for transmitting the alarm to the network and to a client device in communication with the network for immediate action.

In an embodiment, the analysis processor receives one or more of: the data feed from the data capture device using the network, the logging while drilling data feed provided from a logging while drilling server using the network, the seismic profile data feed provided from a seismic server using the network, the drilling parameter data feed provided from a drilling server using the network, the measurement while drilling data feed provided from a measurement while drilling server using the network, the sonar data feed provided from a sonar server using the network, the hydrographic data feed from a hydrographic server using the network, the laser data feed from a laser server using the network; and any combination thereof.

In an embodiment, the plurality of bubble flow classifications may be characterized by the combination of the plurality of bubble flow categories: a time interval, a bubble size, and a velocity.

In an embodiment, the system for monitoring for gas and oil flow venting from the surface further comprises an analysis data storage connected to the analysis processor, wherein the analysis data storage is a non-transitory computer readable medium. In an embodiment, the storage may include computer instructions for storing the data feed in the analysis data storage. In an embodiment, the storage may include the analysis data storage.

In an embodiment, the system for monitoring for gas and oil flow venting from the surface further comprises a power supply connected to the data capture device.

In an embodiment, the system for monitoring for gas and oil flow venting from the surface further comprises a client device in communication with the network. In an embodiment, each client device may be one or more of: a laptop, a computer, a computer board, a cellular phone, a personal digital assistant, or a remote monitoring device with a display for presenting the status of the surface to an observer or a user.

In an embodiment, the storage may include computer instructions for creating a time stamp for the data feed.

In an embodiment, the surface comprises a portion of a natural feature, a man-made feature, and any combination thereof. In an embodiment, the surface comprises a portion of a seabed, a subsea infrastructure and any combination thereof, wherein the subsea infrastructure may be a flow line, pipeline or a well head.

In an embodiment, the data capture device may be at least one of: a video capture device, a sonar capture device, a hydrographic capture device, a laser scanning capture device, and any combination thereof. In an embodiment, the data capture device may be a video capture device. In an embodiment, the data capture device may be a sonar capture device. In an embodiment, the data capture device may be a hydrographic capture device. In an embodiment, the data capture device may be a laser capture device.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIGS. 3A-3B illustrate a diagram of exemplary computer instructions in storage which is part of the system for monitoring a surface for gas and oil flow according to an embodiment of the present invention;

FIGS. 4A-4C illustrate a plurality of exemplary bubble flow categories usable with the system for monitoring gas and oil flow according to an embodiment of the present invention;

FIG. 6 is an exemplary series of steps performed by the system for monitoring gas and oil flow venting from a surface according to an embodiment of the present invention.

DETAILED DESCRIPTION OF THE EMBODIMENTS OF THE INVENTION

Figure 1:
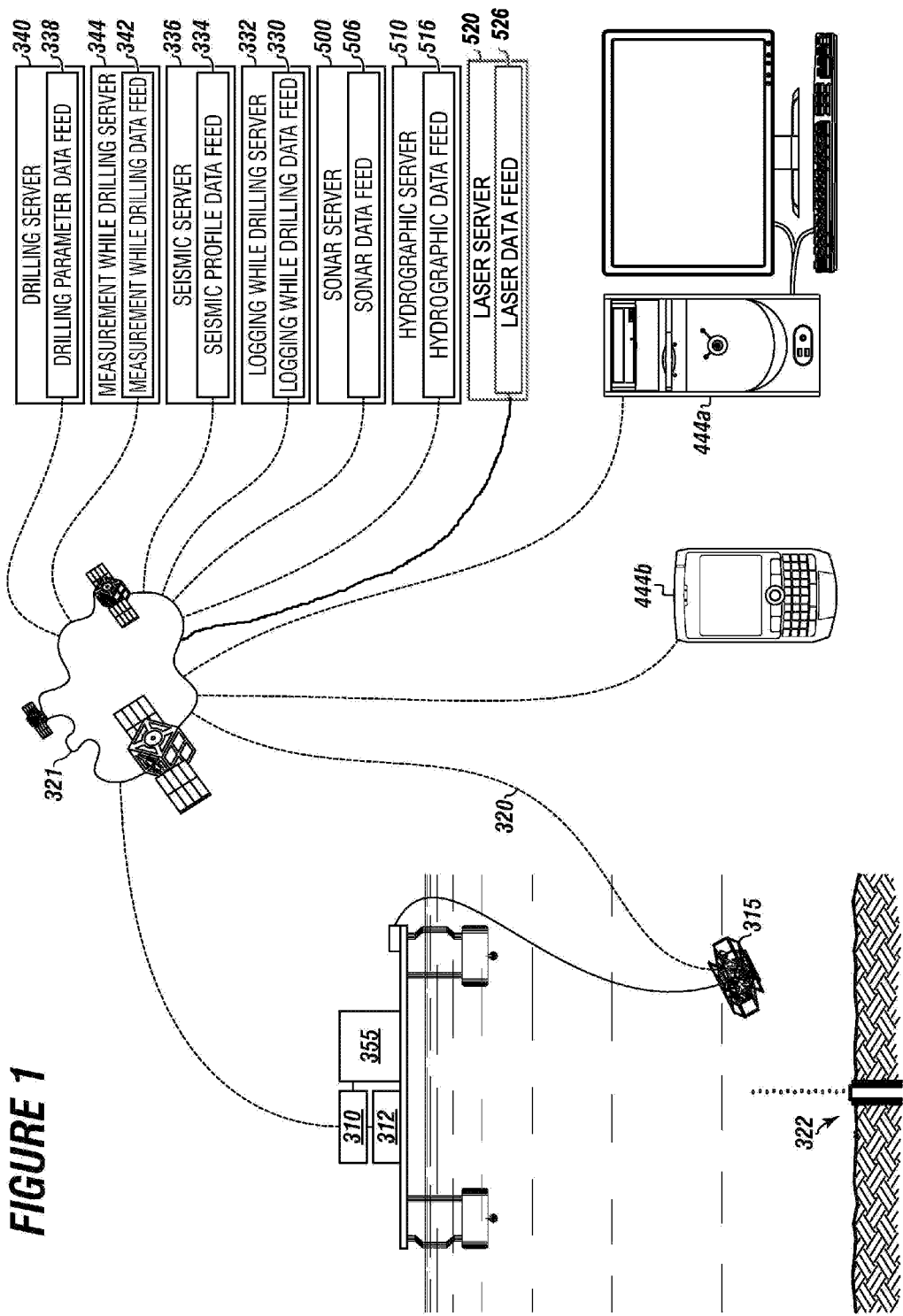
FIG. 1 illustrates a diagram of an exemplary system for monitoring a surface for gas and oil flow according to an embodiment of the present invention.

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein, but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

The present embodiments generally relate to a system for monitoring for gas and oil flow venting from a surface.

The present embodiments use a plurality of bubble flow categories with a data feed at a first time period to determine a baseline bubble flow classification from the surface.

The embodiments use a data feed at a subsequent time period to classify a subsequent bubble flow classification from the surface.

Computer instructions in a storage connected to a processor are used to compare the bubble flow categories and to provide a recommendation to change the baseline bubble flow classification to a subsequent bubble flow classification if warranted.

Computer instructions in the storage are used to connect to various data feeds concerning the observed surface and compare the surface information from those data feeds to assist in assigning a bubble flow classification of gas and oil flow venting from the surface.

The data feed may comprise any suitable data feed for monitoring gas and oil flow. For example, a suitable data feed includes, but is not limited to, a video feed, a logging while drilling data feed, a seismic profile data feed, a drilling parameter data feed, a measurement while drilling data feed, a sonar data feed, a hydrographic data feed, a laser data feed, and any combination thereof. In an embodiment, the data feed includes at least one of: a video feed, a logging while drilling data feed, a seismic profile data feed, a drilling parameter data feed, a measurement while drilling data feed, a sonar data feed, a hydrographic data feed, and a laser data feed. In an embodiment, the data feed includes at least one of: a video feed, a sonar data feed, a hydrographic data feed, and a laser data feed. In an embodiment, the data feed includes a live video feed.

At least one of the data feeds may be provided from separate servers collecting information on the observed surface. The servers are connected to a network which communicates with an analysis processor which may be located remotely, or on a platform, such as a drilling rig.

In an embodiment, the analysis processor communicates at least one data feed to the analysis processor and uses computer instructions to perform comparisons of at least one data feed to the subsequent bubble flow classification assigned to the surface at the subsequent time period.

In an embodiment, the analysis processor communicates at least one data feed to a data storage associated with the analysis processor and uses computer instructions to perform comparisons of at least one data feed to the subsequent bubble flow classification assigned to the surface at the subsequent time period.

Computer instructions in the storage may be used for creating an alert transmitted by the analysis processor via the network if the computer instructions determine that a change in bubble flow classification has occurred.

In an embodiment, the alert may be an alarm, an audible alarm, an email, a text message, any other informational message or a visual graphic displayed on a display of a client device connected to the network.

In an embodiment, the bubble flow classification charts, diagrams, images or tables and computer instructions may be used to display a spreadsheet-like report, wherein the report may provide mathematical calculations, such as an EXCEL™ spreadsheet or the like, on the display of at least one client device.

In an embodiment, the system for monitoring the surface for gas and oil flow may transmit an alarm if the bubble flow classification is outside of predefined acceptable limits, which may vary from one situation to another and require further investigation.

In an embodiment, the alarm may be transmitted to a plurality of users simultaneously. Early detection of hydrocarbons can be communicated for rapid response to minimize the environmental impact of the effect of hydrocarbon flows into the marine environment.

The system saves lives by eliminating the need for divers to personally go and inspect the surface to verify the bubble flow category.

The system saves lives and equipment by the early detection of potentially catastrophic events.

In an embodiment, the system may be used for monitoring a marine well for gas and oil flow during marine drilling operations and for detecting gas and oil flow which can prevent the costly loss of the well, and prevent a need for additional crews to spud a new well, or respud an old well.

In an embodiment, the system may be used for monitoring a marine well for gas and oil flow during marine drilling operations, which can prevent the need for additional heavy equipment. This system helps keep drilling rig personnel safe.

The system avoids the need to use additional high pressure nitrogen on the drilling rig. The system prevents explosions on a rig floor during cementing operations by avoiding the need for additional use of nitrogen under pressure.

The system helps reduce fossil fuel costs by saving rig time by drilling safe wells, reducing rig time, and reducing emissions and fuel consumption. There is also a concurrent reduction in man hour exposure to potential harmful activities on the rig.

In an embodiment, the system may relate to monitoring for gas and oil flow venting from the surface.

In an embodiment, the system for monitoring a surface for gas and oil flow may use a data feed to transmit video or other information from the surface.

In an embodiment, at least one of: a video feed, a sonar data feed, a hydrographic data feed and a laser data feed may be transmitted to an analysis processor that may additionally and simultaneously receive at least one of: a video feed, a logging while drilling data feed, a seismic profile data feed, a drilling parameter data feed, a measurement while drilling data feed, a sonar data feed, a hydrographic data feed and a laser data feed.

In an embodiment, the data feed may be provided to the analysis processor from any suitable data capture device. For example, suitable data capture devices include, but are not limited to, a video capture device, a sonar capture device, a hydrographic capture device, a laser scanning capture device, and any combination thereof.

In an embodiment, the data capture device may be operatively positioned on the surface, or positioned by attaching the data capture device to a portion of equipment adjacent to the surface or on a remotely operated vehicle (ROV) which may be tethered or tether-less, as long as the data capture device may communicate the data feed electronically to the processor, and in some embodiments, to a network.

The video capture device may be any suitable video capture device. For example, suitable video capture devices include, but are not limited to, an underwater camera on a remotely operated vehicle (ROV), a camera connected to a pole or fixed structure pointed at the surface and placed underwater, and any combination thereof.

The sonar capture device may be any suitable sonar capture device. For example, suitable sonar capture devices, include, but are not limited to, an autonomous sonar capture device, a sonar capture device on a remotely operated vehicle (ROV), a sonar capture device connected to a pole or fixed structure pointed at the surface and placed underwater, a sonar capture device towed behind a vehicle on or below the surface, and any combination thereof.

The hydrographic capture device may be any suitable hydrographic capture device. For example, suitable hydrographic capture devices include, but are not limited to, an autonomous hydrographic capture device, a hydrographic capture device on a remotely operated vehicle (ROV), a hydrographic capture device connected to a pole or fixed structure pointed at the surface and placed underwater, a hydrographic capture device towed behind a vehicle on or below the surface, and any combination thereof.

The laser scanning capture device may be any suitable laser scanning capture device. For example, suitable laser scanning devices, include, but are not limited to, an autonomous laser scanning capture device, a laser scanning capture device on a remotely operated vehicle (ROV), a laser scanning capture device connected to a pole or fixed structure pointed at the surface and placed underwater, a laser scanning capture device towed behind a vehicle on or below the surface, and any combination thereof.

The data feed may be transferred to an analysis processor using any suitable telemetry. For example, suitable telemetry includes, but is not limited to, a fiber optic, a wireless transmission, a direct connection through a network, and any combination thereof.

The analysis processor may be any suitable computing device configured to display, receive, store and transmit video or other information from a data capture device. For example, suitable computing devices include, but are not limited to, a cell phone, a computer, a laptop, a tablet, a portable digital device, or any combination thereof configured to display, receive, store and transmit video or other information from a data capture device.

In an embodiment, if not already activated, the data feed to the analysis processor may be initiated when a first bubble observed time is recorded into the analysis processor by an observer and/or a user when a first bubble is observed to flow from the surface.

In an embodiment, the data feed to the analysis processor may be initiated when drilling operations begin.

In an embodiment, an alert may be generated when a first gas bubble is observed.

In an embodiment, the analysis processor registers the moment in time when a first gas bubble is recorded and measures a first time interval from the moment the first gas bubble is recorded to when a second gas bubble is recorded and then a first analysis is performed using the plurality of bubble flow categories in the storage to determine a time interval, a bubble size, a velocity, or any combination thereof resulting in a bubble flow classification, and designates the bubble flow classification as the baseline bubble flow classification.

In an embodiment, the analysis processor repeats the analysis for a subsequent time period, forming a subsequent bubble flow classification.

If the subsequent bubble flow classification from the subsequent time period is different from the baseline bubble flow classification, for example, if the subsequent bubble size of the subsequent bubble flow classification changes from the first bubble size or if the time interval or the velocity of bubble flow changes, then the analysis processor verifies if the subsequent bubble flow classification signifies a problem by checking the various data feeds for change. If a change within predefined acceptable limits is identified an alert is transmitted to the users of client devices connected to the network and the subsequent bubble flow classification becomes the baseline. If a change outside of predefined acceptable limits is identified an alarm is transmitted to the users of client devices connected to the network to investigate a potentially dangerous situation and the subsequent bubble flow classification becomes the baseline.

Exemplary System for Monitoring a Surface for Gas and Oil Flow

Turning to the Figures, FIG. 1 depicts a diagram of an exemplary system for monitoring a surface for gas and oil flow according to an embodiment of the present invention.

In an embodiment, the system for monitoring a surface 322 includes an analysis processor 310, which is connected to a power supply 355 and may receive a data feed (e.g., video feed 320) of the surface 322 in real time.

Analysis Processor

The analysis processor 310 may be any suitable computing device configured to display, receive, store and transmit video or other information from a data capture device (e.g., video capture device 314). For example, suitable computing devices include, but are not limited to, a cell phone, a computer, a laptop, a tablet, a portable digital device, or any combination thereof configured to display, receive, store and transmit video or other information from a data capture device (e.g., video capture device 314).

In an embodiment, if not already activated, the data feed (e.g., video feed 320) to the analysis processor 310 may be initiated when a first bubble observed time is recorded into the analysis processor 310 by an observer and/or a user when a first bubble is observed to flow from the surface 322.

In an embodiment, the data feed (e.g., video feed 320) to the analysis processor 310 may be initiated when drilling operations begin.

In an embodiment, an alert may be generated when a first gas bubble is observed.

In an embodiment, the analysis processor 310 registers the moment in time when a first gas bubble is recorded and measures a first time interval from the moment the first gas bubble is recorded to when a second gas bubble is recorded and then a first analysis is performed using the plurality of bubble flow categories in the storage 312 to determine a time interval, a bubble size, a velocity, or any combination thereof resulting in a bubble flow classification, and designates the bubble flow classification as the baseline bubble flow classification.

In an embodiment, the analysis processor 310 repeats the analysis for a subsequent time period, forming a subsequent bubble flow classification.

If the subsequent bubble flow classification from the subsequent time period is different from the baseline bubble flow classification, for example, if the subsequent bubble size of the subsequent bubble flow classification changes from the first bubble size or if the time interval or the velocity of bubble flow changes, then the analysis processor 310 verifies if the subsequent bubble flow classification signifies a problem by checking the various data feeds 320, 330, 334, 338, 342, 506, 516, 526 for a change. If a change within predefined acceptable limits is identified an alert is transmitted to the users of client devices 444*a*, 444*b* connected to the network 321 and the subsequent bubble flow classification becomes the baseline. If a change outside of predefined acceptable limits is identified, an alarm is transmitted to the users of client devices 444*a*, 444*b* connected to the network 321 to investigate a potentially dangerous situation and the subsequent bubble flow classification becomes the baseline.

Data Feeds

The data feed may comprise any suitable data feed for monitoring gas and oil flow. For example, a suitable data feed includes, but is not limited to, a video feed 320, a logging while drilling data feed 330, a seismic profile data feed 334, a drilling parameter data feed 338, a measurement while drilling data feed 342, a sonar data feed 502, a hydrographic data feed 506, a laser data feed 510, and any combination thereof. In an embodiment, the data feed includes at least one of: a video feed 320, a logging while drilling data feed 330, a seismic profile data feed 334, a drilling parameter data feed 338, a measurement while drilling data feed 342, a sonar data feed 502, a hydrographic data feed 506, and a laser data feed 510. In an embodiment, the data feed includes at least one of: a video feed 320, a sonar data feed 502, a hydrographic data feed 506, and a laser data feed 510. In an embodiment, the data feed includes a live video feed 320.

In an embodiment, the data feed includes a video feed 320 from a video capture device 314. In an embodiment, the video capture device 314 may be a video feed recorder on a tethered remotely operated vehicle (ROV) 315, or a video feed recorder mounted to subsea equipment for viewing the surface 322. In an embodiment, the video capture device 314 may be on a remotely operated vehicle (ROV) 315, as shown in FIG. 1.

In an embodiment, the data feed includes a sonar data feed 506 from a sonar capture device 530. In an embodiment, the sonar capture device 530 may be on a remotely operated vehicle (ROV) 315, a vessel, a floating platform or vehicle, an underwater vehicle, any other underwater structure, and any combination thereof.

In an embodiment, the data feed includes a hydrographic data feed 516 from a hydrographic capture device 532. In an embodiment, the hydrographic capture device 532 may be on a remotely operated vehicle (ROV) 315, a vessel, a floating platform or vehicle, an underwater vehicle, any other underwater structure, and any combination thereof.

In an embodiment, the data feed includes a laser data feed 516 from a laser scanning capture device 534. In an embodiment, the laser scanning device 534 may be on a remotely operated vehicle (ROV) 315, a vessel, a floating platform or vehicle, an underwater vehicle, any other underwater structure, and any combination thereof.

Data Capture Devices

In an embodiment, the data feed may be provided to the analysis processor 310 from any suitable data capture device. For example, suitable data capture devices include, but are not limited to, a video capture device 320, a logging while drilling capture device, a seismic profile capture device, a drilling parameter capture device, a measurement while drilling capture device, a sonar capture device 530, a hydrographic capture device 532, a laser scanning capture device 534, and any combination thereof.

In an embodiment, the video feed 320 may be provided to the analysis processor 310 from any suitable video capture device 314. For example, suitable video capture devices 314 include, but are not limited to, an underwater camera or a video feed recorder on a remotely operated vehicle (ROV) 315, a camera or a video feed recorder connected to a pole or fixed structure pointed at the surface and placed underwater, or any combination thereof. In an embodiment, the video capture device 314 may be a video feed recorder on a tethered remotely operated vehicle (ROV) 315, or a video feed recorder mounted to subsea equipment for viewing the surface 322.

In an embodiment, the video capture device 314 may be operatively positioned on the surface, or positioned by attaching the video capture device 314 to a portion of equipment adjacent to the surface or on a remotely operated vehicle (ROV) 315 which maybe tethered or tether-less, as long as the video capture device 314 may communicate the video feed 320 electronically to the analysis processor 310, and, in some embodiments, to a network 321.

In an embodiment, the hydrographic data feed 516 may be provided to the analysis processor 310 from any suitable hydrographic capture device 532. For example, suitable hydrographic capture devices 532 include, but are not limited to, an underwater camera on a remotely operated vehicle (ROV), a camera connected to a pole or fixed structure pointed at the surface and placed underwater, or any combination thereof.

Surface

A surface may be a portion of the seabed, as well as flow lines, pipelines, marine wells, wellheads, subsea infrastructure, vents, mounds, depressions, other natural or man-made features, or any combination thereof.

Methods of Using System

In an embodiment, the data feed (e.g., video feed 320) may be provided by a direct connection to the analysis processor 310 or by using a network 321 in communication with the analysis processor 310. In an embodiment, the data feed includes a live video feed.

In an embodiment, the data feed (e.g., video feed 320) and surface information data feeds (e.g., a logging while drilling data feed 330, a seismic profile data feed 334, a drilling parameter data feed 338, a measurement while drilling data feed 342, a sonar data feed 506, a hydrographic data feed 516, a laser data feed 526, etc.) from other servers (e.g., a logging while drilling server 332, a seismic server 336, a drilling server 340, a measurement while drilling server 344, a sonar server 500, a hydrographic server 510, a laser server 520, etc.) concerning the surface 322 are received by the analysis processor 310 and, optionally, stored in an analysis data storage connected to or in communication with the analysis processor 310. In an embodiment, the storage 312 may include the analysis data storage.

If not already engaged, the video feed 320 to the analysis processor 310 is initiated when a first bubble is observed.

When a first gas bubble is observed, a time marker is transmitted to the analysis processor 310 starting the analysis processor 310 computing a first time interval.

In an embodiment, the analysis processor 310 receives at least one of: a video feed 320, a logging while drilling data feed 330 about a surface 322 provided in real time using the network 321 from a logging while drilling server 332, a seismic profile data feed 334 about the surface 322 provided in real time using the network 321 from a seismic server 336, a drilling parameter data feed 338 about a surface 322 provided in real time using the network 321 from a drilling server 340, a measurement while drilling data feed 342 about the surface 322 provided in real time from a measurement while drilling server 344, a sonar data feed 506 in real time from a sonar server 500, a hydrographic data feed 516 in real time from a hydrographic server 510 and a laser data feed 526 in real time from a laser server 520.

In an embodiment, a single server may perform the duties of these seven exemplary servers 332, 336, 340, 344, 500, 510 and 520. In an embodiment, one or more severs maybe used in any combination and may perform the duties of the seven exemplary servers depicted.

Network

The network 321 may be any suitable communication network. For example, suitable networks 321 include, but are not limited to, an internet, a global communication network, a local area network, a satellite network, a wide area network, a similar network known in the industry, and any combination thereof.

Client Devices

In an embodiment, the network 321 may also be in communication with a plurality of client devices 444a, 444b that receive alerts and/or alarms and information on the baseline bubble flow classification and subsequent bubble flow classifications from the analysis processor 310 through the network 321.

The client devices 444a, 444b may be any suitable client device. For example, suitable client devices 444a, 444b include, but are not limited to, a cellular phone, a desktop computer, a laptop, a personal digital assistant device, a tablet, any other similar client devices, and any combination thereof.

Figure 2:
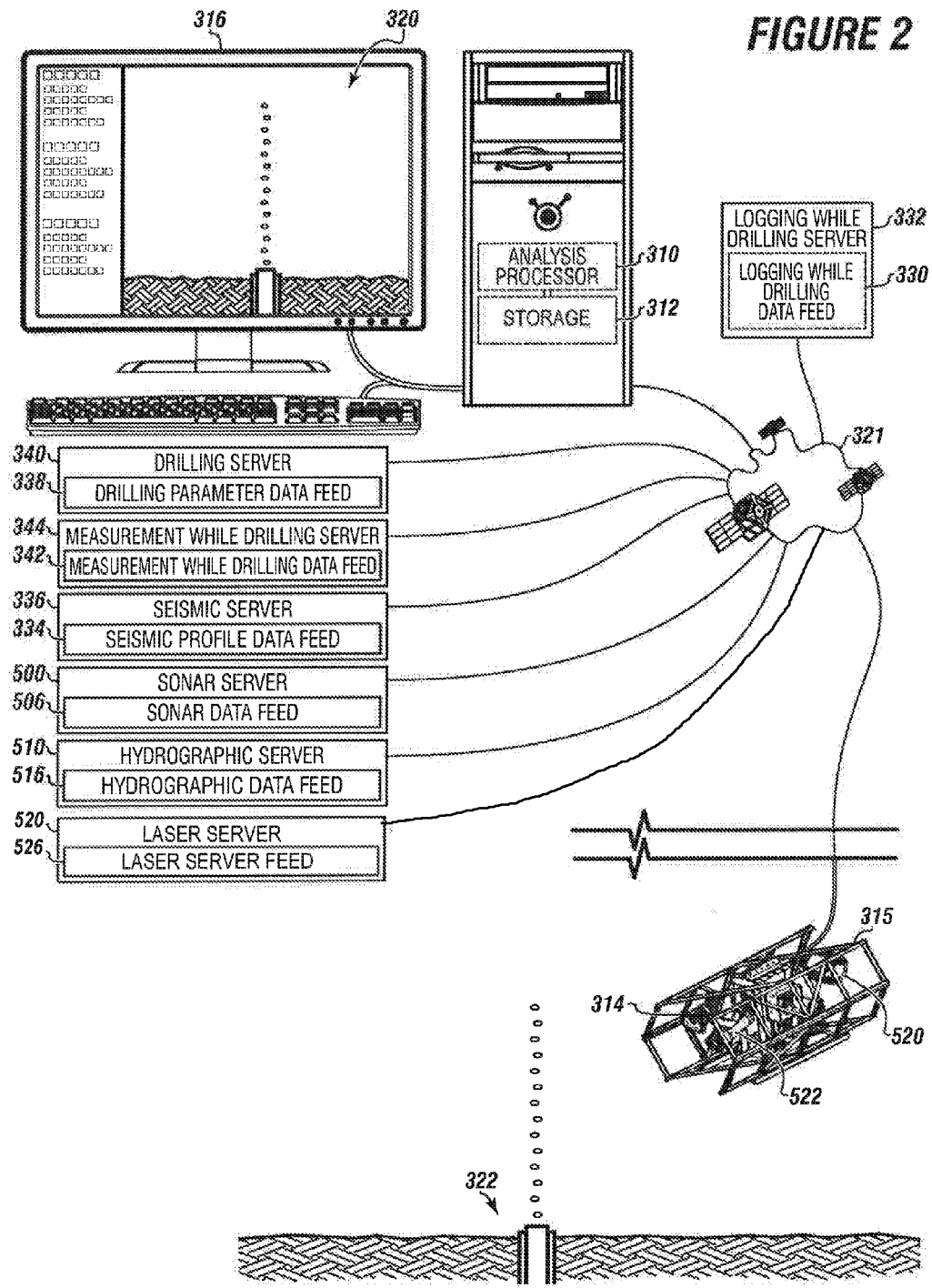
FIG. 2 illustrates a detail of the exemplary system in FIG. 1.

FIG. 2 depicts a detail of the a system for monitoring a surface 322 for gas and oil flow showing the video feed 320 on a display device 316.

In an embodiment, the analysis processor 310 is shown in communication with the storage 312.

In an embodiment, the analysis processor 310 connects to the display device 316, which may display the determined baseline bubble flow classification using the data feed (e.g., video feed 320) from the data capture device (e.g., video capture device 314) mounted on the remotely operated vehicle (ROV) 315 and the bubble flow classification in the storage 312.

In an embodiment, the data capture device (i.e., a video capture device 314) is shown as an underwater camera.

In an embodiment, a sonar capture device 520, a hydrographic capture device 522 and/or a laser scanning capture device 524 may also be mounted on a remotely operated vehicle (ROV), a vessel, a floating platform or vehicle, an underwater vehicle, any other underwater structure, or a combination thereof.

The analysis processor 310 may be any suitable processor known in the art. For example, suitable analysis processors 310 include, but are not limited to, a cellular phone, a computer board, a desktop computer, a laptop, a tablet, or a similar device.

The display device 316 may be any suitable display known in the art. For example, suitable display devices 316 include, but are not limited to, a display on a handheld device, a monitor, a TV screen, or similar device.

The display device 316 may be in communication with the data capture device (e.g., video capture device 314) using any form of telemetry.

Storage

The storage 312 may be any suitable non-transitory computer readable medium. For example, suitable storage 312 includes, but is not limited to, a flash drive, a hard disk drive, a solid state drive, a tape drive or similar storage device. The term "non-transitory computer readable medium" excludes any transitory signals, but includes any non-transitory data storage circuitry known in the art (e.g., a buffer, a cache, a queue or similar circuitry) within transceivers of transitory signals. In an embodiment, the storage may include an analysis data storage.

Servers

The servers may be any suitable computing device configured to receive, store and transmit data and/or information. For example, suitable servers include, but are not limited to, computers in communication with the analysis processor 310, computers in communication with a network 321 to provide information and/or data to the analysis processor 310, and any combination thereof.

FIGS. 7A-7G illustrate diagrams of various exemplary servers usable by the system for monitoring gas and oil flow according to an embodiment of the present invention.

For example, the logging while drilling server 332 may be a computer with a processor and a data storage containing a logging while drilling data feed 330, which provides the logging while drilling data to the analysis processor 310 using the network 321.

Figure 7A:
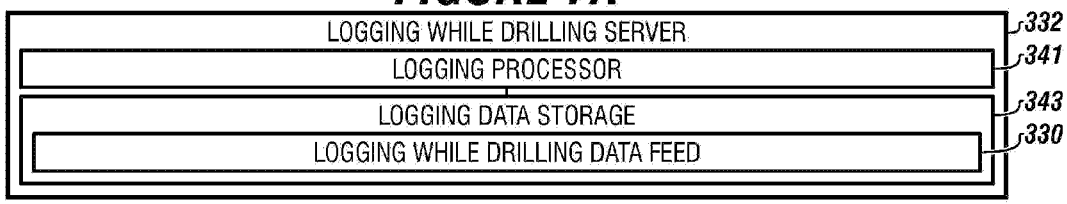
FIGS. 7A-7G illustrate diagrams of various exemplary servers usable by the system with gas and oil flow monitoring according to an embodiment of the present invention.

FIG. 7A shows a logging while drilling server 332 with a logging processor 341 and a logging data storage 343. The logging data storage 343 may have a logging while drilling data feed 330.

For example, the seismic server 336 may be a computer with a processor and a data storage containing a seismic profile data feed 334, which provides the seismic profile data to the analysis processor 310 using the network 321.

Figure 7B:
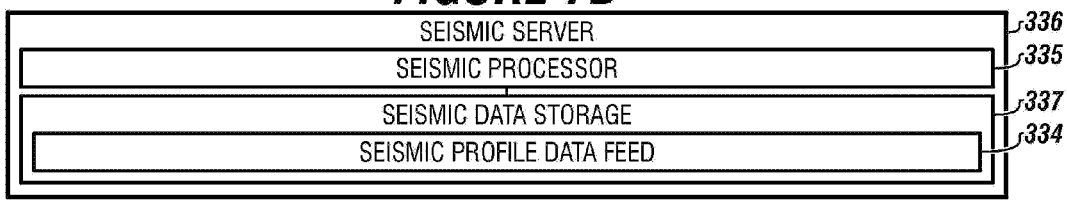

FIG. 7B shows a seismic server 336 with a seismic processor 335 and a seismic data storage 337. The seismic data storage 337 may have a seismic profile data feed 334.

For example, the drilling server 340 may be a computer with a processor and a data storage containing a drilling parameter data feed 338, which provides the drilling parameter data to the analysis processor 310 using the network 321.

Figure 7C:
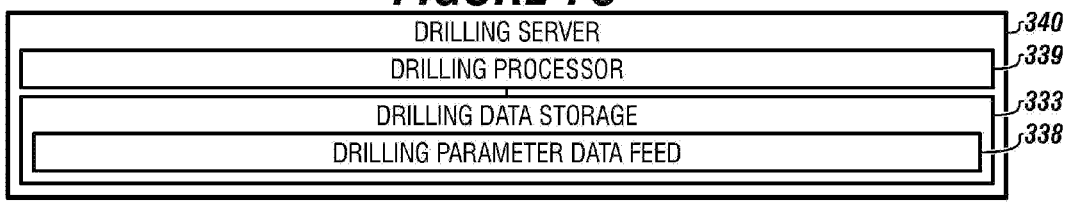

FIG. 7C shows a drilling server 340 with a drilling processor 339 and a drilling data storage 333. The drilling data storage 333 may have a drilling parameter data feed 338.

For example, the measurement while drilling server 344 may be a computer with a processor and a drilling data storage containing a measurement while drilling data feed 342, which provides the measurement while drilling data to the analysis processor 310 using the network 321.

Figure 7D:
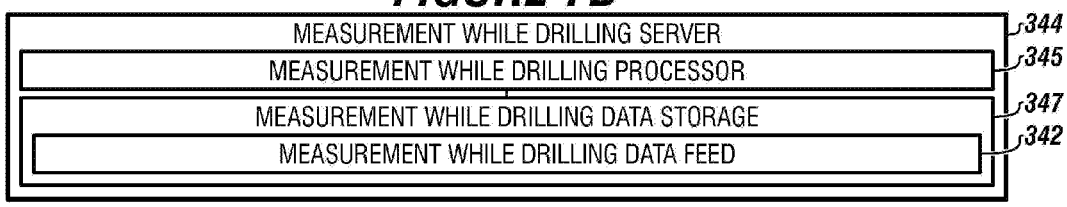

FIG. 7D shows a measurement while drilling server 344 with a measurement while drilling processor 345 and a measurement while drilling data storage 347. The measurement while drilling data storage 347 may have a measurement while drilling data feed 342.

For example, the sonar server 500 may be a computer with a processor and a data storage containing a sonar data feed 506, which provides the sonar data to the analysis processor 310 using the network 321.

Figure 7E:
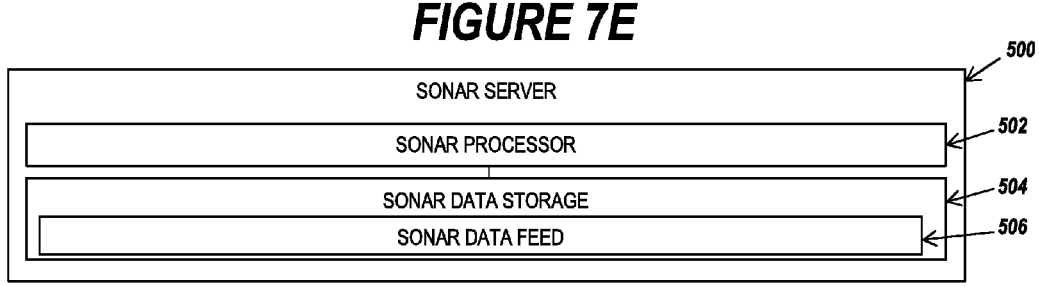

FIG. 7E shows a sonar server 500 with a sonar processor 502 and a sonar data storage 504. The sonar data storage 504 may have a sonar data feed 506.

For example, the hydrographic server 510 may be a computer, with a processor and a sonar data storage containing a hydrographic data feed 516, which provides the hydrographic data to the analysis processor 310 using the network 321.

Figure 7F:
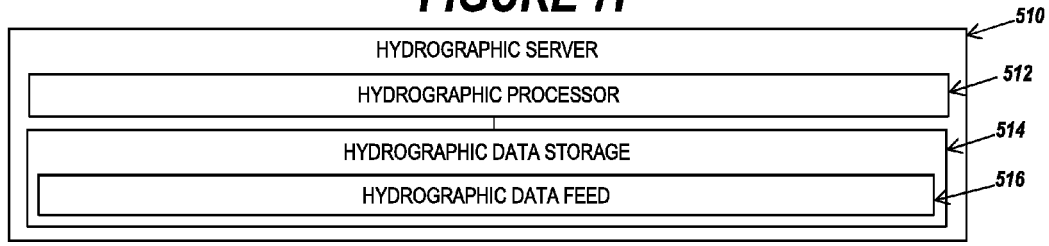

FIG. 7F shows a hydrographic server 510 with a hydrographic processor 512 and a hydrographic data storage 514. The hydrographic data storage 514 may have a hydrographic data feed 516.

For example, the laser scanning server 508 may be a computer, with a processor and a data storage containing a laser data feed 510, which provides the laser data to the analysis processor 310 using the network 321.

Figure 7G:
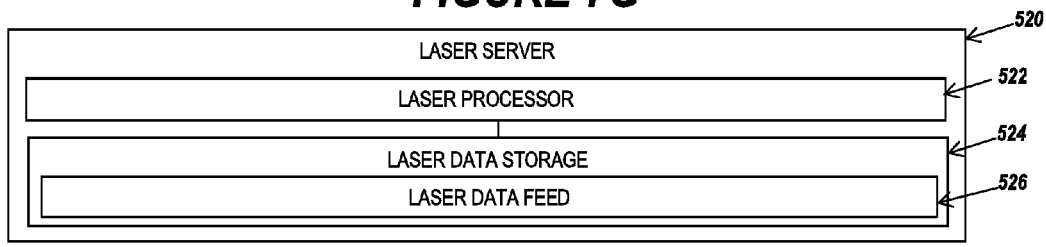

FIG. 7G shows a laser server 508 with a laser processor 522 and a laser data storage 524. The laser data storage 524 may have a laser data feed 526.

Exemplary Methods for Monitoring a Surface for Gas and Oil Flow

Figure 3B:
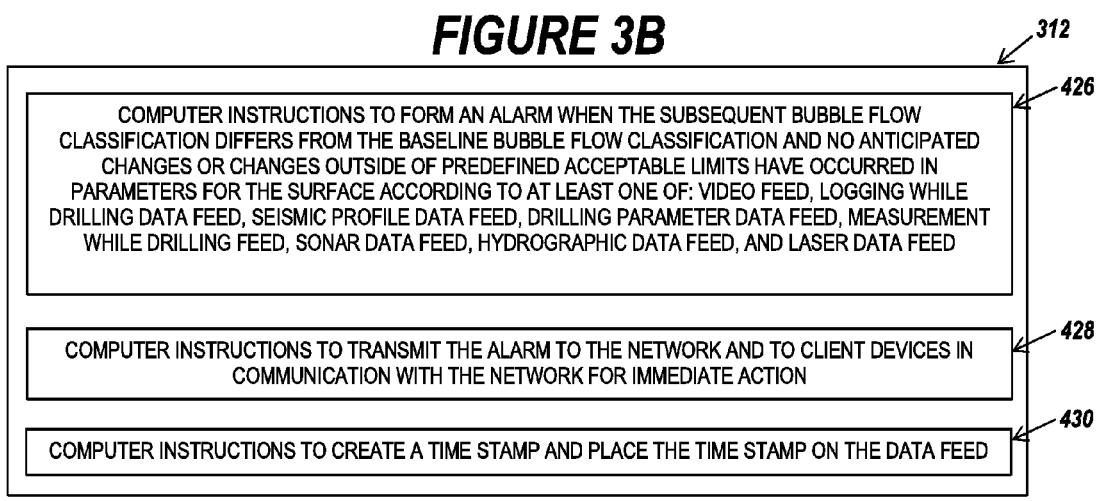

FIGS. 3A-3B depict diagrams of exemplary computer instructions in the storage which is part of the system for monitoring gas and oil flow according to an embodiment of the present invention.

Example 1

As an example depicted in FIGS. 3A-3B, during the first time interval, from when a first gas bubble is observed until a second gas bubble is observed, the data feed (e.g., video feed 320) from the data capture device (e.g., video capture device 314) is started; and time stamps of the dates and times that the first gas bubble and second gas bubble are observed are created and, optionally, stored in the analysis data storage. In an embodiment, the storage 312 may include an analysis data storage.

In an embodiment, the data feed is monitored for patterns of bubble flow of gas bubbles venting from the surface and a bubble flow classification is determined using the plurality of bubble flow categories.

In an embodiment, the monitored patterns are analyzed for bubble size, time interval, and velocity of upward travel of gas bubbles flowing from the surface and an initial baseline bubble flow classification is assigned.

For example, the first time interval may be the difference in time from when the first gas bubble with a first size and a first velocity to the time when a second gas bubble with a second size and a second velocity is recorded. The first time interval may be a 2 minute time interval from when a first gas bubble is recorded. The plurality of bubble flow categories are used with information from the plurality of servers on the network 321 to assign a baseline bubble flow classification to the surface.

In an embodiment, the surface 322 is then observed for a subsequent time interval to establish if a subsequent pattern of bubble flow of gas bubbles venting from the surface and the subsequent bubble flow classification is different from the baseline.

The subsequent time interval can be any suitable subsequent time interval. For example, a suitable subsequent time interval includes, but is not limited to, about 10 seconds to about 10 minutes, or any value or range there between. In an embodiment, the subsequent time interval is about 10 seconds to about 4 minutes, or any value or range there between. In an embodiment, the subsequent time interval is about 2 minutes or about 4 minutes.

In an embodiment, the recorded observed patterns of bubble flow of gas bubbles for observed time intervals with bubble size and velocity are analyzed using the plurality of bubble flow classifications with each bubble flow category having a unique time interval, bubble size and velocity to assign a bubble flow classification.

If the patterns of bubble flow of gas bubbles and observed bubble sizes, time intervals, or velocities for the subsequent bubble flow classification match the baseline, then no additional analysis is needed other than continued monitoring for changes in the baseline bubble flow classification.

If the patterns of bubble flow of gas bubbles for the subsequent observed bubble size, time interval, or velocity does not match the baseline, further analysis is performed. For example, the baseline bubble flow classification may be for a first time interval of 10 seconds, a bubble size of 1 cm, and a velocity of 1 m/s producing a baseline bubble flow classification 4/1/1, and for a subsequent time interval of 2 minutes, a bubble size of 1 cm, and a velocity of 1 m/s results in a bubble flow of category 2/1/1. Since the baseline bubble flow classification does not match the subsequent bubble flow classification an analysis is performed using at least one of: the video feed 320, the logging while drilling data feed 330, the seismic profile data feed 334, the drilling parameter data feed 338, the measurement while drilling data feed 342, the sonar data feed 506, hydrographic data feed 516, and the laser data feed 526 to assign the subsequent bubble flow classification as the baseline bubble flow classification and, optionally, transmit an alert.

When an alert is generated, then additional analysis may be performed, including subsequent observations of the patterns of bubble flow of gas bubbles and further analysis of at least one of: the video feed 320, the logging while drilling data feed 330, the seismic profile data feed 334, the drilling parameter data feed 338, the measurement while drilling data feed 342, the sonar data feed 506, the hydrographic data feed 516, and the laser data feed 526.

If the additional analysis concludes that the deviation from the baseline is due to an anticipated change or change within predefined acceptable limits in the video feed 320, the logging while drilling data feed 330, the seismic profile data feed 334, the drilling parameter data feed 338, the measurement while drilling data feed 342, the sonar data feed 506, the hydrographic data feed 516, and the laser data feed 526, then no additional analysis is needed other than continued monitoring for changes in the baseline bubble flow classification.

If the additional analysis concludes that the deviation from the baseline is not due to an anticipated change or change within predefined acceptable limits in the video feed 320, the logging while drilling data feed 330, the seismic profile data feed 334, the drilling parameter data feed 338, the measurement while drilling data feed 342, the sonar data feed 506, the hydrographic data feed 516, and the laser data feed 526, an alarm may be transmitted to the user of at least one client device connected to the network to investigate a potentially dangerous situation and further bubble flow analysis can be initiated. In an embodiment, the alarm may be transmitted to multiple users of the plurality of client devices 444a, 444b connected to the network 321.

In an embodiment, the storage 312 may be connected to the video feed 320, the logging while drilling data feed 330, the seismic profile data feed 334, the drilling parameter data feed 338, the measurement while drilling data feed 342, the sonar data feed 506, the hydrographic data feed 516, the laser data feed 520, and any combination thereof.

In an embodiment, the storage 312 may have computer instructions 410 for receiving a first gas bubble observed time, or optionally, a beginning of drilling operations time.

In an embodiment, the storage 312 may have computer instructions 411 for receiving and, optionally, storing the data feed (e.g., video feed 320) in an analysis data storage. In an embodiment, the storage 312 may include the analysis data storage.

Figure 5:
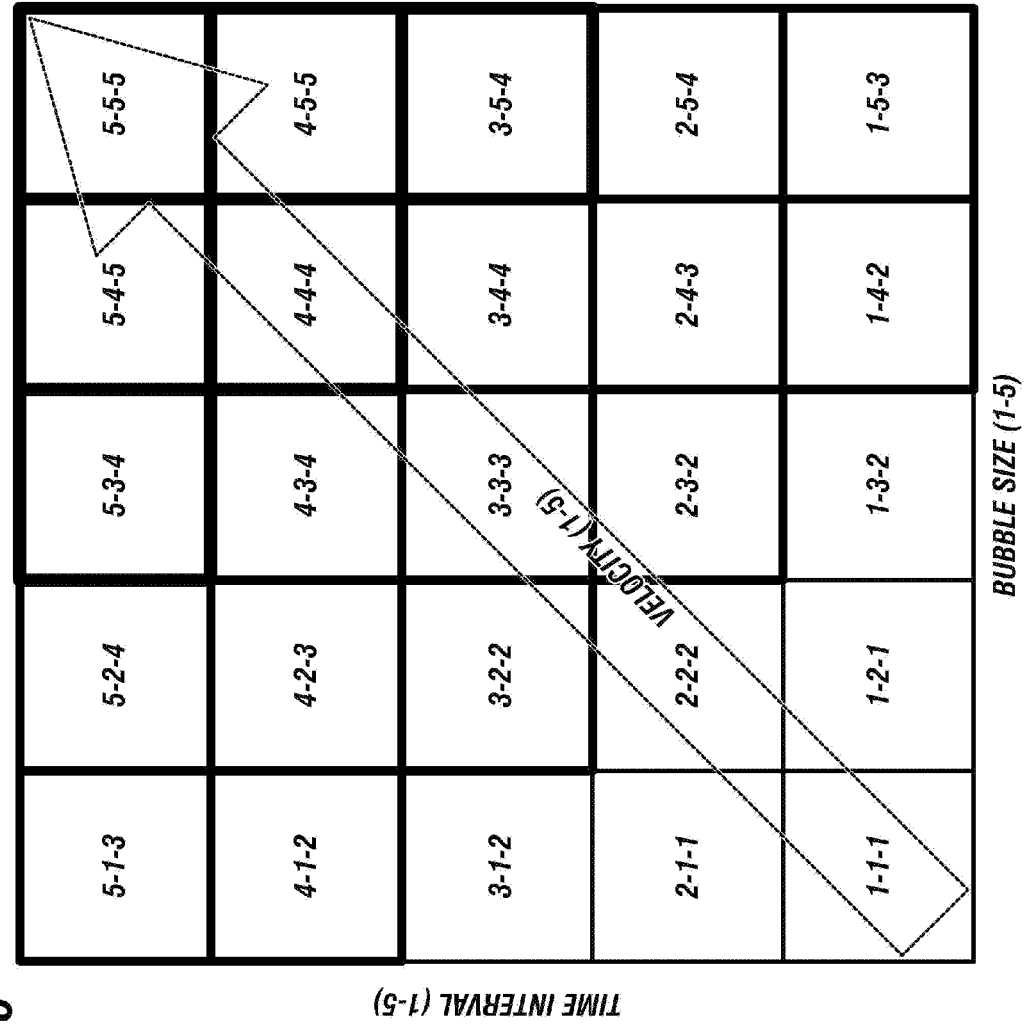
FIG. 5 illustrates an exemplary bubble flow classification chart, which depicts various classifications of the plurality of bubble flow categories usable with the system for monitoring gas and oil flow according to an embodiment of the present invention.

In an embodiment, the storage 312 may contain a bubble flow classification chart or table 414, which provides a plurality of bubble flow classifications of bubble flow from the surface 322, as shown in FIG. 5.

In an embodiment, the storage 312 may have computer instructions 415 for comparing the data feed (e.g., video feed 320) during a first time interval with a first bubble size and a first bubble velocity from a first bubble observed time to the plurality of bubble flow categories and the bubble flow classifications, identifying a baseline bubble flow classification from the plurality of bubble flow categories that most closely matches the data feed (e.g., video feed 320), and designating the baseline bubble flow classification for the surface 322.

In an embodiment, the storage 312 may have computer instructions 416 for comparing the data feed (e.g., video feed 320) during a subsequent time period with a subsequent bubble size and a subsequent bubble velocity from subsequent bubble observed time intervals to the plurality of bubble flow categories and bubble flow classifications, identifying a subsequent bubble flow classification from the plurality of bubble flow categories that most closely matches the data feed (e.g., video feed 314) during the subsequent time interval.

In an embodiment, the storage 312 may have computer instructions 418 for comparing the subsequent bubble flow classification from the subsequent time interval to the baseline bubble flow classification and, if the subsequent bubble flow classification is different than the baseline bubble flow classification, computer instructions for designating the subsequent bubble flow classification as the baseline bubble flow classification and, optionally, forming an alert.

In an embodiment, the storage 312 may have computer instructions 420 for using data feeds from at least one of: the video feed 320, the logging while drilling data feed 330, the seismic profile data feed 334, the drilling parameter data feed 338, the measurement while drilling data feed 342, the sonar data feed 506, the hydrographic data feed 516, and laser data feed 526 to determine if anticipated changes or changes within predefined acceptable limits have occurred in parameters of the surface 322.

In an embodiment, the storage 312 may have computer instructions 426 for forming an alarm when the subsequent bubble flow classification differs from the baseline bubble flow classification and no anticipated changes or changes outside of predefined acceptable limits have occurred in parameters for the surface 322 according to at least one of: the video feed 320, the logging while drilling data feed 330, the seismic profile data feed 334, the drilling parameter data feed 338, the measurement while drilling data feed 342, the sonar data feed 506, the hydrographic data feed 516, and the laser data feed 526.

In an embodiment, the storage 312 may have computer instructions 428 for transmitting the alarm to the network 321 and to client devices 444a, 444b in communication with the network 321 for immediate action.

In an embodiment, the storage 312 may have computer instructions 430 for creating a time stamp and place the time stamp on the images or other information of the data feed (e.g., video feed 320).

Bubble Flow Categories

The bubble flow categories may be any suitable bubble flow categories for monitoring gas and oil flow. For example, suitable bubble flow categories include, but are not limited to, various bubble flow category charts, diagrams, images, tables, and any combinations thereof. In an embodiment, the bubble flow categories may be identified from bubble flow categories (T/S/V) defined by a time between bubbles (T), a size of bubble (S) and a velocity of bubbles (V), as shown in FIG. 4A-4C.

Examples of Bubble Flow Categories

Figure 4C:
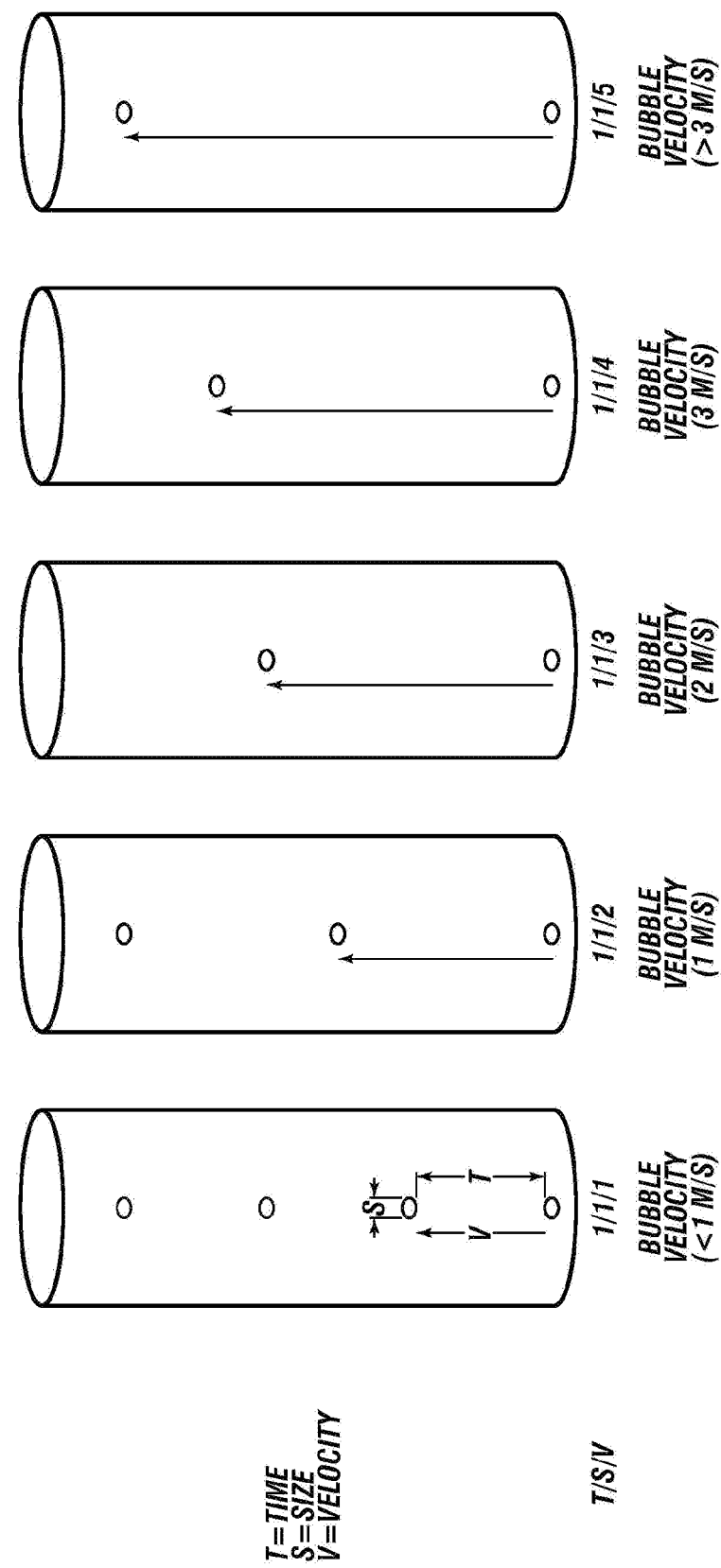

FIGS. 4A-4C illustrate a plurality of exemplary bubble flow categories usable with the system for monitoring gas and oil flow according to an embodiment of the present invention.

FIG. 4A depicts one of the pluralities of exemplary bubble flow categories, shown as time interval bubble flow categories, with differing bubble time intervals and non-changing size and non-changing velocity. For example, a bubble every 2 minutes having a size of <1 cm with a velocity of <1 meter every second observed out of the surface would be classified as 1/1/1. For example, a bubble every 2-1 minute having a size of <1 cm with a velocity of <1 meter every second observed out of the surface would be classified as 2/1/1.

FIG. 4B depicts one of the pluralities of exemplary bubble flow categories, shown as size bubble flow categories, with differing bubble sizes and non-changing time intervals and non-changing bubble velocity. For example, a bubble every 2 minutes having a size of <1 cm with a velocity of <1 meter every second observed out of the surface would be classified as 1/1/1. For example, a bubble every 2 minutes having a size of 1-3 cm with a velocity of <1 meter every second observed out of the surface would be classified as 1/2/1.

FIG. 4C depicts one of the pluralities of exemplary bubble flow categories, shown as velocity bubble flow categories, with differing bubble velocities and non-changing size and non-changing time intervals. For example, a bubble every 2 minutes having a size of <1 cm with a velocity of <1 meter every second observed out of the surface would be classified as 1/1/1. For example, a bubble every 2 minutes having a size of <1 cm with a velocity of 1 meter every second observed out of the surface would be classified as 1/1/2.

In an embodiment, the storage 312 contains computer instructions that use the data feed (e.g., video feed 320), and compares the data feed (e.g., video feed 320) to images or other information to a plurality of bubble flow categories.

In an embodiment, the computer instructions may be used to form a baseline bubble flow classification, and identify trends of changes in bubble flow patterns of bubbles out of the surface using the observed time intervals, bubble sizes, and bubble flow velocity patterns.

For example, if a bubble flow pattern is identified during a first time period of 2 minutes with a first time interval of 45 seconds, a first bubble size of 2 cm and with a first velocity of 3 m/s as bubble flow category 3/2/4 and assigned bubble flow category 3/2/4 as the baseline bubble flow classification, and during a subsequent time period of 2 minutes a subsequent bubble flow category is identified with a second time interval of 25 seconds, a second bubble size of 2 cm and with a second velocity of 3 m/s a bubble flow classification 4/2/4 is identified, then the baseline bubble flow classification can be changed to the different category 4/2/4 as "a new baseline bubble flow classification."

Bubble Flow Classification

The bubble flow classification may be any suitable bubble flow classification for monitoring gas and oil flow. For example, suitable bubble flow classifications include, but are not limited to, various bubble flow classification charts, diagrams, images, tables, and any combination thereof. In an embodiment, the bubble flow classification may be identified from a bubble flow classification chart or table of various bubble flow categories, wherein the time between bubbles (T) is 1 to n, size of bubbles (S) is 1 to n, the velocity of bubbles (V) is 1 to n. In an embodiment, the bubble flow classification may be identified from a bubble flow classification chart or table of various bubble flow categories, wherein the time between bubbles (T) is 1 to 5, size of bubbles (S) is 1 to 5 and the velocity of bubbles (V) is 1 to 5, as shown in FIG. 5.

Exemplary Bubble Flow Classification Chart

FIG. 5 illustrates an exemplary bubble flow classification chart, which depicts a portion of the various possible combinations of the plurality of bubble flow categories, wherein the time between bubbles (T) is 1 to 5, the size of bubbles (S) is 1 to 5 and the velocity of bubbles (V) is 1 to 5, usable with the system for monitoring gas and oil flow according to an embodiment of the present invention.

In an embodiment, the bubble flow classification chart includes one hundred twenty five bubble flow categories (T/S/V), as shown in FIG. 5.

Example 2

FIG. 6 describes an exemplary series of steps performed by a system for monitoring for gas and oil flow venting from a surface according to an embodiment of the invention.

In an embodiment, the data feed (e.g., video feed 320) may be continuously monitored by the analysis processor 310 using the bubble flow categories and the bubble flow classification to determine bubble flow patterns and rates including time intervals, bubble size, and velocities of the surface 322 being observed. In an embodiment, the data feed includes at least one of: a video feed 320, a logging while drilling data feed 330, a seismic profile data feed 334, a drilling parameter data feed 338, a measurement while drilling data feed 342, a sonar data feed 506, a hydrographic data feed 516, and a laser data feed 526. In an embodiment, the data feed includes a live video feed 320.

In an embodiment, the system for monitoring gas and oil flow venting from a surface receives a data feed (e.g., video feed 320) on a display device connected to an analysis processor 310 in communication with a data capture device (e.g., video capture device 314), shown as step 100. In an embodiment, the data capture device includes a video capture device 314, a sonar capture device 530, a hydrographic capture device 532, a laser scanning capture device 534, and any combination thereof. In an embodiment, the data capture device includes a video capture device 314.

In an embodiment, the data feed (e.g., video feed 320) may include images or other information of the surface 322 before the first bubble observed time until after a bubble flow classification is identified.

In an embodiment, the system for monitoring gas and oil flow venting from a surface uses an analysis processor 310 with computer instructions to create a time stamp, and place the time stamp on individual images or other information of the data feed (e.g., video feed 320), shown as step 102.

In an embodiment, the system for monitoring gas and oil flow venting from a surface continuously monitors the data feed (e.g., video feed 320) to determine bubble flow patterns including: bubble time intervals, bubble sizes, and velocities from the surface 322, shown as step 104.

In an embodiment, the system for monitoring gas and oil flow venting from a surface compares the bubble flow patterns including: bubble time intervals, bubble sizes, and velocities from the surface 322 to the bubble flow categories, shown as step 106.

In an embodiment, the system for monitoring gas and oil flow venting from a surface uses the bubble flow categories to classify the bubble flow from the surface 322, forms a baseline bubble flow classification for the surface 322, and links the baseline bubble flow classification to the data feed (e.g., video feed 320) with a time stamp between a first start observation time and a first ending observation time, shown as step 108.

In an embodiment, the system for monitoring gas and oil flow venting from a surface repeats steps 104, 106 and 108 to perform a subsequent analysis of the surface 322 over a subsequent time period, forming a subsequent bubble flow classification for the surface 322 and linking the subsequent bubble flow classification to data feed (e.g., video feed 320) with a subsequent time stamp between a subsequent start observation time and a subsequent ending observation time, shown as step 110.

In an embodiment, the system for monitoring gas and oil flow venting from a surface compares the subsequent bubble flow classification to the baseline bubble flow classification to determine if a change in bubble time intervals, bubble sizes, or velocities have occurred, shown as step 112.

In an embodiment, the system for monitoring gas and oil flow venting from a surface performs a bubble flow analysis when a change in bubble time intervals, bubble sizes, velocities, or any combination thereof has been determined by analyzing at least one of: a video feed 320, a logging while drilling data feed 330, a seismic profile data feed 334, a drilling parameter data feed 338, a measurement while drilling data feed 342, a sonar data feed 506, a hydrographic data feed 516, and a laser data feed 526, shown as step 114.

In an embodiment, bubble flow analysis includes the evaluation of at least one of: the video feed 320, the logging while drilling data feed 330, the seismic profile data feed 334, the drilling parameter data feed 338, the measurement while drilling data feed 342, the sonar data feed 506, the hydrographic data feed 516, and the laser data feed 526.

In an embodiment, the system for monitoring gas and oil flow venting from a surface renames the subsequent bubble flow classification as the baseline bubble flow classification when the bubble flow analysis determines that a change in bubble time intervals, bubble sizes, velocities, or any combination thereof has occurred, shown as step 116.

In an embodiment, the system for monitoring gas and oil flow venting from a surface forms an alert when the bubble flow analysis determines that the change in bubble time intervals, bubble sizes, velocities or any combination thereof is within predefined acceptable limits and transmits the alert for additional analysis to be performed, including subsequent observations of the patterns of bubble flow and further analysis of at least one of: the video feed 320, the logging while drilling data feed 330, the seismic profile data feed 334, the drilling parameter feed 338, the measurement while drilling data feed 342, the sonar data feed 506, the hydrographic data feed 516, and the laser data feed 526, shown as step 117.

In an embodiment, the system for monitoring gas and oil flow venting from a surface forms an alarm when the bubble flow analysis determines that the change in bubble time intervals, bubble sizes, velocities or any combinations thereof is outside of predefined acceptable limits, and transmits the alarm for immediate action, shown as step 118.

In an embodiment, the alarm may be transmitted through the network 321 to the plurality of client devices 444a, 444b.

In an embodiment, the system for monitoring gas and oil flow venting from a surface may repeat steps 104, 106 and 108 when no change in bubble time intervals, bubble sizes, velocities or any combination thereof occurs after the subsequent bubble flow classification has been established, shown as step 120.

In an embodiment, the system for monitoring gas and oil flow venting from a surface may repeat steps 104, 106 and 108 for multiple subsequent time periods.

Example 3

As another example, the system for monitoring gas and oil flow venting from a surface may be used as follows:

During a first time period when a first bubble is observed, the system for monitoring gas and oil flow venting from a surface records a data feed (e.g., video feed 320) from the surface 322 being observed. In an embodiment, the data feed includes at least one of: a video feed 320, logging while drilling data feed 330, a seismic profile data feed 334, a drilling parameter data feed 338, a measurement while drilling data feed 342, a sonar data feed 506, a hydrographic data feed 516, and a laser data feed 526. In an embodiment, the data feed includes a live video feed 320.

In an embodiment, the system for monitoring gas and oil flow venting from a surface records a time when the first bubble is observed from the surface 322, starting the first time interval.

In an embodiment, the system for monitoring gas and oil flow venting from a surface records a time when the second bubble is observed from the surface 322, ending the first time interval.

In an embodiment, the system for monitoring gas and oil flow venting from a surface records a time when a first bubble flow category is identified, ending the first time period.

In an embodiment, the system for monitoring gas and oil flow venting from a surface compares the data feed (e.g., video feed 320) to the plurality of bubble flow categories to identify a classification that most closely matches the data feed (e.g., video feed 320) and assigns this classification as the baseline bubble flow classification to the surface 322.

During a subsequent time interval when a third and fourth bubble is observed, the system for monitoring gas and oil flow venting from a surface records a subsequent data feed (e.g., video feed 320) from the surface 322 being observed.

In an embodiment, the system for monitoring gas and oil flow venting from a surface compares the subsequent data feed (e.g., video feed 320) to the bubble flow categories to identify a subsequent bubble flow classification that most closely matches the subsequent data feed (e.g., video feed 320).

In an embodiment, a first bubble observed time may be input into the analysis processor 310 by an observer and/or a user when a first bubble is observed to flow from the surface 322.

While these embodiments have been described with emphasis on the embodiments, it should be understood that within the scope of the appended claims, the embodiments might be practiced other than as specifically described herein.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms (e.g., "outer" and "inner," "upper" and "lower," "first" and "second," "internal" and "external," "above" and "below" and the like) are used as words of convenience to provide reference points and, as such, are not to be construed as limiting terms.

The embodiments set forth herein are presented to best explain the present invention and its practical application and to thereby enable those skilled in the art to make and utilize the invention. However, those skilled in the art will recognize that the foregoing description has been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

DEFINITIONS

As used herein, the terms "a," "an," "the," and "said" mean one or more, unless the context dictates otherwise.

As used herein, the term "about" means the stated value plus or minus a margin of error of plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more element(s) recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

As used herein, the phrase "consisting of" is a closed transition term used to transition from a subject recited before the term to one or more material element(s) recited after the term, where the material element or elements listed after the transition term are the only material element(s) that make up the subject.

As used herein, the term "real time" refers to a live video capture with an optional live data capture that occurs using sensors at a moment in time that is the same moment in time that the data is captured.

As used herein, the term "simultaneously" means occurring at the same time or about the same time, including concurrently.

As used herein, the term "subsequent" refers to a second, a third, a fourth, or any further term after the first term.

As used herein, the term "surface" refers to a portion of the seabed, as well as flow lines, pipelines, wellheads, subsea infrastructure, vents, mounds, depressions, other natural or man-made features, and combinations thereof.

As used herein, the phrases "system for monitoring a surface for gas and oil flow" and "system for monitoring for gas and oil flow venting from a surface" include monitoring bubbles and globules venting from the surface.

As used herein, the phrase "time interval" means a time from when a first bubble venting from the surface is observed to a time when a second bubble venting from the surface or the time between subsequent bubbles is observed for the purpose of establishing a bubble flow classification.

As used herein, the phrase "time period" means a time from when an observation of gas and oil flow venting from the surface for the purpose of establishing a bubble flow classification begins to when the observation of gas and oil flow venting from the surface for the purpose of establishing a bubble flow classification ends.

INCORPORATION BY REFERENCE

All patents and patent applications, articles, reports, and other documents cited herein are fully incorporated by reference to the extent they are not inconsistent with this invention.

What is claimed is:

1. A system for monitoring for gas and oil flow venting from a surface, wherein the system comprises:
   a. a data feed from a data capture device;
   b. an analysis processor connected to a network for receiving the data feed;
   c. a storage connected to the analysis processor, wherein the storage is a non-transitory computer readable medium;
   d. computer instructions in the storage to receive a first bubble observed time inputted into the analysis processor when a first bubble is observed to flow from the surface;
   e. computer instructions in the storage to receive the data feed in the analysis processor;
   f. computer instructions in the storage for comparing the data feed during a first time interval from the first bubble observed time to a plurality of bubble flow categories in the storage; and
   g. computer instructions in the storage for identifying a bubble flow classification from a plurality of bubble flow classifications in the storage that most closely matches the data feed during the first time interval.

2. The system for monitoring for gas and oil flow venting from the surface of claim 1, wherein the plurality of bubble flow categories comprise a plurality of bubble time intervals, a plurality of bubble sizes and a plurality of bubble velocities.

3. The system for monitoring for gas and oil flow venting from the surface of claim 1, wherein the plurality of bubble flow classification in the storage comprises a plurality of bubble flow classifications of bubble flow from the surface.

4. The system for monitoring for gas and oil flow venting from the surface of claim 3 further comprising:
   computer instructions in the storage for designating the bubble flow classification as a baseline bubble flow classification for the surface.

5. The system for monitoring for gas and oil flow venting from the surface of claim 4 further comprising:
   computer instructions in the storage for comparing the data feed during a subsequent time interval from a subsequent first bubble observed time to the plurality of bubble flow categories, identifying a subsequent bubble flow classification from the plurality of bubble flow classification in the storage that most closely matches the data feed during the subsequent time interval; and
   computer instructions in the storage for comparing the subsequent bubble flow classification from the subsequent time period to the baseline bubble flow classification.

6. The system for monitoring for gas and oil flow venting from the surface of claim 5, wherein the computer instructions designate the subsequent bubble flow classification as the baseline bubble flow classification and generate an alert if the baseline bubble flow classification is different.

7. The system for monitoring for gas and oil flow venting from the surface of claim 5, wherein the computer instructions designate the subsequent bubble flow classification as the baseline bubble flow classification and generate an informational message if the baseline bubble flow classification is the same.

8. The system for monitoring for gas and oil flow venting from the surface of claim 1, wherein the data feed comprises one or more of: a video feed, a seismic profile data feed, a logging while drilling data feed, a drilling parameters data feed, a measurement while drilling data feed, a sonar data feed, a hydrographic data feed and a laser data feed to determine if anticipated changes or changes within predefined acceptable limits have occurred in the data feed.

9. The system for monitoring for gas and oil flow venting from the surface of claim 5, wherein the data feed comprises one or more of: a video feed, a seismic profile data feed, a logging while drilling data feed, a drilling parameter data feed, a measurement while drilling data feed, a sonar data feed, a hydrographic data feed and a laser data feed to determine if anticipated changes or changes within predefined acceptable limits have occurred in the data feed.

10. The system for monitoring for gas and oil flow venting from the surface of claim 9, wherein the data feed comprises a video feed to determine if anticipated changes or changes within predefined acceptable limits have occurred in the data feed.

11. The system for monitoring for gas and oil flow venting from the surface of claim 9, wherein the data feed comprises a sonar data feed to determine if anticipated changes or changes within predefined acceptable limits have occurred in the data feed.

12. The system for monitoring for gas and oil flow venting from the surface of claim 9, wherein the data feed comprises a hydrographic data feed to determine if anticipated changes or changes within predefined acceptable limits have occurred in the data feed.

13. The system for monitoring for gas and oil flow venting from the surface of claim 9, wherein the data feed comprises a laser data feed to determine if anticipated changes or changes within predefined acceptable limits have occurred in the data feed.

14. The system for monitoring for gas and oil flow venting from the surface of claim 5 further comprising computer instructions in the storage for forming an alarm when the subsequent bubble flow classification differs from the baseline bubble flow classification and no anticipated changes or changes outside of predefined acceptable limits have occurred in the data feed according to one or more of: the video feed, the seismic profile data feed, the logging while drilling data feed, the drilling parameter data feed, the measurement while drilling data feed, the sonar data feed, the hydrographic data feed and the laser data feed.

15. The system for monitoring for gas and oil flow venting from the surface of claim 14 further comprising computer instructions in the storage for transmitting the alarm to the network and to a client device in communication with the network for immediate action.

16. The system for monitoring for gas and oil flow venting from the surface of claim 9, wherein the analysis processor receives one or more of:
   a. the data feed from the data capture device using the network;
   b. the logging while drilling data feed provided from a logging while drilling server using the network;
   c. the seismic profile data feed provided from a seismic server using the network;
   d. the drilling parameter data feed provided from a drilling server using the network;

e. the measurement while drilling data feed provided from a measurement while drilling server using the network;
f. the sonar data feed provided from a sonar server using the network;
g. the hydrographic data feed from a hydrographic server using the network;
h. the laser data feed from a laser server using the network; and
i. any combination thereof.

17. The system for monitoring for gas and oil flow venting from the surface of claim 1, wherein the plurality of bubble flow classifications are characterized by one or more of the plurality of bubble flow categories:
    a. a time interval;
    b. a bubble size; and
    c. a velocity.

18. The system for monitoring for gas and oil flow venting from the surface of claim 1 further comprising:
    an analysis data storage connected to the analysis processor, wherein the analysis data storage is a non-transitory computer readable medium; and
    computer instructions in the storage for storing the data feed in the analysis data storage.

19. The system for monitoring for gas and oil flow venting from the surface of claim 1, comprising a power supply connected to the data capture device.

20. The system for monitoring for gas and oil flow venting from the surface of claim 1, comprising a client device in communication with the network, wherein each client device is one or more of: a laptop, a computer, a computer board, a cellular phone, a personal digital assistant, or a remote monitoring device with a display for presenting the status of the surface to an observer or a user.

21. The system for monitoring for gas and oil flow venting from the surface of claim 1, further comprising computer instructions in the storage for creating a time stamp for the data feed.

22. The system for monitoring for gas and oil flow venting from the surface of claim 1, wherein the surface comprises a portion of a natural, man-made feature or combinations thereof.

23. The system for monitoring for gas and oil flow venting from the surface of claim 1, wherein the surface comprises a portion of a seabed, subsea infrastructure and combinations thereof, wherein the subsea infrastructure is a flow line, pipeline or a well head.

24. The system for monitoring for gas and oil flow venting from the surface of claim 1, wherein the data capture device is at least one of: a video capture device, a sonar capture device, a hydrographic capture device, a laser scanning capture device; and any combination thereof.

25. The system for monitoring for gas and oil flow venting from the surface of claim 1, wherein the data capture device is a sonar capture device.

26. The system for monitoring for gas and oil flow venting from the surface of claim 1, wherein the data capture device is a hydrographic capture device.

27. The system for monitoring for gas and oil flow venting from the surface of claim 1, wherein the data capture device is a laser capture device.

* * * * *

UNITED STATES PATENT AND TRADEMARK OFFICE
CERTIFICATE OF CORRECTION

PATENT NO. : 9,568,628 B2
APPLICATION NO. : 15/011098
DATED : February 14, 2017
INVENTOR(S) : William J. Berger, III et al.

Page 1 of 1

It is certified that error appears in the above-identified patent and that said Letters Patent is hereby corrected as shown below:

In the Claims

Claim 3 Lines 2-3 reading "plurality of bubble flow classification in the storage" should be corrected to read --plurality of bubble flow classifications in the storage--

Claim 5 Lines 7-8 reading "plurality of bubble flow classification in the storage" should be corrected to read --plurality of bubble flow classifications in the storage--

Signed and Sealed this
Sixth Day of June, 2017

Michelle K. Lee
*Director of the United States Patent and Trademark Office*